(12) United States Patent
Kim et al.

(10) Patent No.: US 11,687,988 B2
(45) Date of Patent: *Jun. 27, 2023

(54) SYSTEM AND METHOD FOR TRADING OF USED BICYCLE

(71) Applicant: WRIGHTBROTHERS CO., LTD., Seoul (KR)

(72) Inventors: Hee Soo Kim, Seoul (KR); Byung Soo Kim, Seongnam-si (KR); Sang Bum Kim, Seoul (KR)

(73) Assignee: WRIGHTBROTHERS CO., LTD., Seoul (KR)

( * ) Notice: Subject to any disclaimer, the term of this patent is extended or adjusted under 35 U.S.C. 154(b) by 187 days.

This patent is subject to a terminal disclaimer.

(21) Appl. No.: 17/152,635

(22) Filed: Jan. 19, 2021

(65) Prior Publication Data

US 2021/0142378 A1 May 13, 2021

Related U.S. Application Data

(63) Continuation of application No. 15/872,866, filed on Jan. 16, 2018, now Pat. No. 10,929,903.

(30) Foreign Application Priority Data

Jan. 18, 2017 (KR) .......................... 10-2017-0008677

(51) Int. Cl.
```
G06Q 30/00      (2023.01)
G06Q 30/0601    (2023.01)
G06Q 10/087     (2023.01)
G06Q 30/06      (2023.01)
```
(52) U.S. Cl.
CPC ....... *G06Q 30/0609* (2013.01); *G06Q 10/087* (2013.01); *G06Q 30/06* (2013.01); *G06Q 30/0611* (2013.01); *G06Q 30/0613* (2013.01); *G06Q 30/0627* (2013.01); *G06Q 30/0629* (2013.01); *G06Q 30/0639* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 2004/0158502 A1 | 8/2004 | Adams et al. | |
| 2011/0273171 A1* | 11/2011 | Gehnen | ..................... G01B 7/10 324/705 |
| 2014/0188649 A1* | 7/2014 | Messinger | .......... H04L 41/0886 705/26.1 |
| 2017/0248549 A1 | 8/2017 | Smith | |

FOREIGN PATENT DOCUMENTS

| | | |
|---|---|---|
| JP | 2002-334232 A | 11/2002 |
| KR | 10-2002-0008558 A | 1/2002 |
| KR | 10-2004-0111495 A | 12/2004 |
| KR | 10-2016-0038433 A | 4/2016 |

OTHER PUBLICATIONS

Korean Office Action dated Mar. 12, 2018 in connection with the counterpart Korean Patent Application No. 10-2017-0008677.

* cited by examiner

*Primary Examiner* — Mila Airapetian
(74) *Attorney, Agent, or Firm* — Hauptman Ham, LLP

(57) ABSTRACT

The present invention relates to a system for intermediating a used bicycle trade-in between a seller and a buyer, comprising a bicycle verifying part including a non-destructive testing or NDT module for verifying inside of a frame of a bicycle provided by the seller.

8 Claims, 3 Drawing Sheets

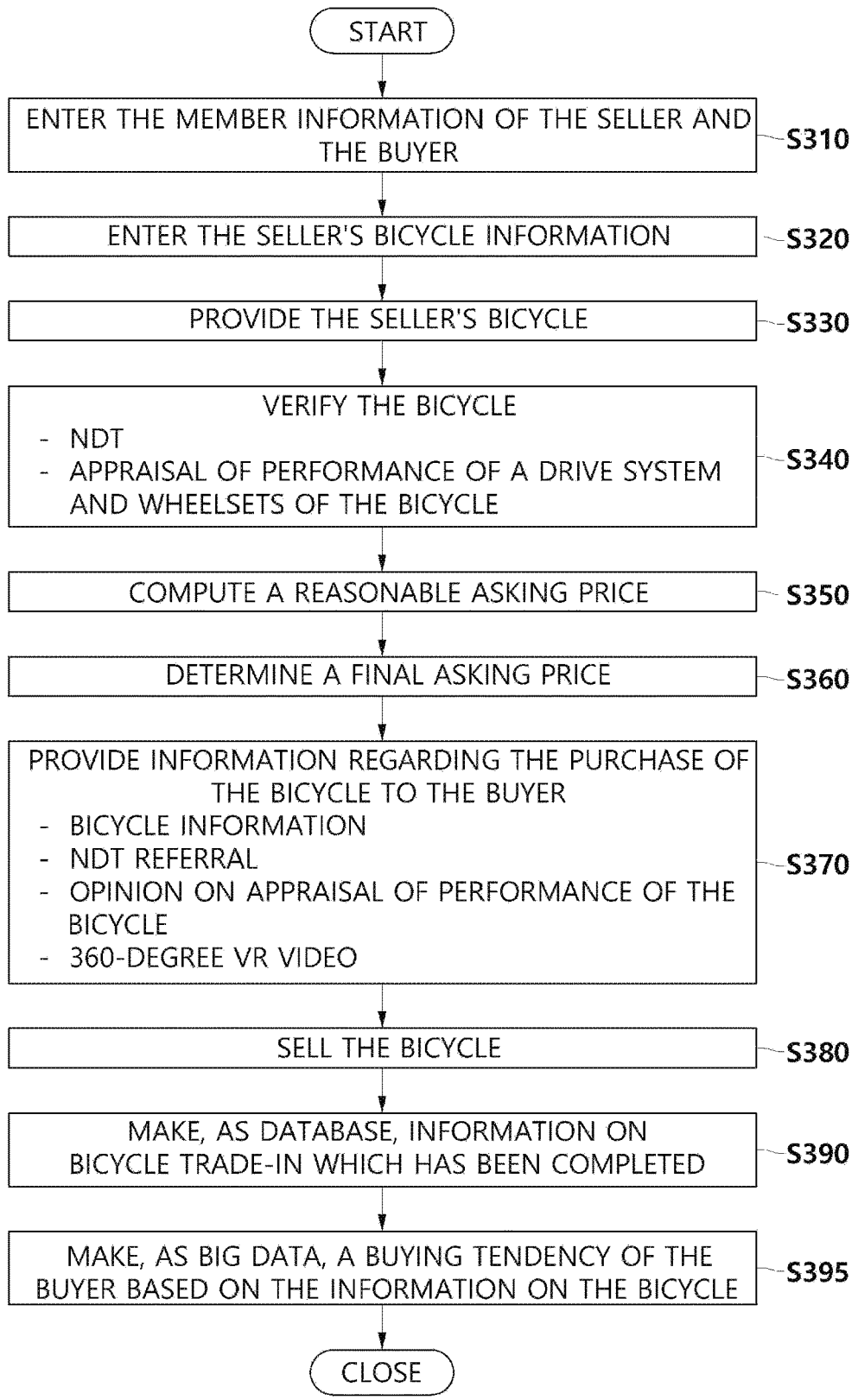

SYSTEM AND METHOD FOR TRADING OF USED BICYCLE

CROSS REFERENCE TO RELATED APPLICATION

The present application is a continuation of U.S. patent application Ser. No. 15/872,866, filed Jan. 16, 2018, which claims priority under 35 U.S.C. 119(a) to Korean Patent Application No. 10-2017-0008677 filed on Jan. 18, 2017, the disclosures of which are hereby incorporated by reference in their entireties.

FIELD OF THE INVENTION

The present invention relates to a system and a method for trading in used bicycles; and more particularly, to the more reliable system and the more reliable method for trading the used bicycles by verifying them.

BACKGROUND OF THE INVENTION

Recently, as bicycles are recommended to use and a lot of bicycle lanes are built to improve health and reduce environmental pollution caused by vehicles, the number of bikers tends to increase. Even in South Korea, bicycles are used in a variety of reasons, including for leisure, for riding on mountains, etc., beyond just means of transportation and expensive bicycles come into wide use. As bicycles are used in a variety of reasons, the number of users who tune up their bicycles is increasing. Accordingly, as it is difficult to compute reasonable prices of used bicycles, the South Korean market of used bicycles is not active.

Now, the South Korean market of used bicycles consists of a direct dealing market where bikers trade in their bicycles through offline bicycle stores, online bicycle communities, or exclusive websites for dealing with used goods. Depending on model years, mileage, and accident history of used bicycles of the same model, sellers offer all the prices. Too many Chinese imitations of expensive carbon fiber reinforced plastics (or CFRP)-framed bicycles through online direct buying and information asymmetry arising from difficulties or impossibilities of identifying a crack in the CFRP frame from the outside by appearance undermine trust between parties in transactions. Even though used bicycles are successfully traded in, it is impossible to use a variety of payment methods except cash payments only and retailers deal with only initial buyers of bicycles. Therefore, even though finding any defects of the used bicycles they have bought, buyers of used bicycles cannot complain to anyone about such defects and cannot but take any damage. Therefore, the market of used bicycles is on the decline.

SUMMARY OF THE INVENTION

It is an object of the present invention to provide a more reliable method for trading in used bicycles through objective verification of the used bicycles and a more reliable system by using the method.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art:

FIG. 3 is a flowchart roughly representing a method for trading in a used bicycle in accordance with one example embodiment of the present invention.

DETAILED DESCRIPTION OF THE PREFERRED EMBODIMENTS

Figure 1:
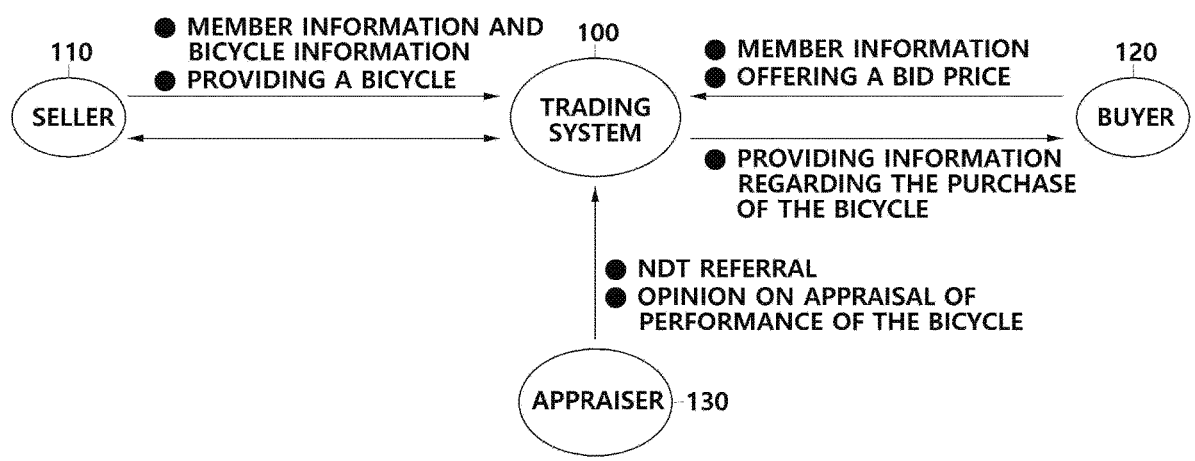
FIG. 1 is a drawing schematically illustrating a concept of a system for trading in used bicycles in accordance with the present invention.
Figure 2:
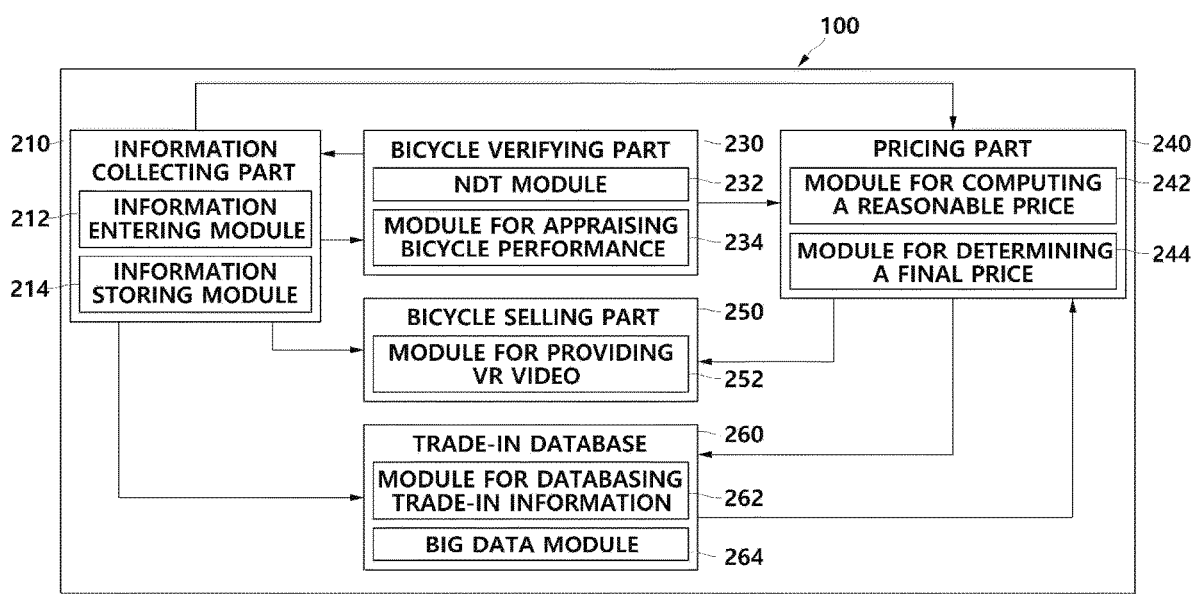
FIG. 2 is a block diagram schematically illustrating a system for trading in used bicycles in accordance with one example embodiment of the present invention.

FIG. 1 is a drawing schematically illustrating a concept of a system for trading in used bicycles in accordance with the present invention and FIG. 2 is a block diagram schematically illustrating a system for trading in used bicycles in accordance with one example embodiment of the present invention.

By referring to FIG. 1, a system for trading in used bicycles 100 in accordance with the present invention is a system for intermediating between a seller 110 and a buyer 120 to help them trade in a used bicycle. The system 100 receives member information and bicycle information entered by the seller 110 and member information entered by the buyer 120. The system 100 classifies and stores the entered member information and the entered bicycle information. The seller 110 provides the bicycle s/he wants to sell to the system 100, which causes an appraiser 130 to verify the bicycle. At the time, the appraiser 130 performs non-destructive testing (NDT) on the inside of the bicycle frame and appraises performance of a drive system and wheelsets of the bicycle. Based on the appraisal, the system 100 computes a reasonable asking price of the bicycle and determines a final asking price by comparing the reasonable asking price with a selling price expected by the seller 110. The system 100 sells the bicycle to the buyer 120 based on the final asking price.

The system 100 in accordance with the present invention takes charge of an online process between a seller and a buyer at a state of connecting to a system server or a server, generally for example, as a user's personal computer, tablet, mobile phone, etc., managed by the seller or the buyer. In other words, the system 100 in accordance with the present invention allows the seller to sell its used bicycle to the buyer at a reasonable price at a state of organically connecting to the server by using a communications network including the Internet, Wi-Fi, 3G, 4G LTE, etc.

The system 100 in accordance with the present invention includes the system server that communicates with the server managed by the seller 110 or the buyer 120. Herein, the system server includes a database server, a web server, a mobile server, etc. The system server manages a separate webpage, website or mobile website. Under a precondition that the seller 110 and the buyer 120 join to be members, as the seller 110 enters the information on the used bicycle, information regarding the bicycle, including a type, time of manufacture and purchase, a condition, etc. of the bicycle is created on the webpage, which provides a web environment where the information is offered to the buyer 120. In addition, the system server provides a web environment where a verified result, including a NDT referral, an opinion on appraisal of performance of the bicycle, etc., is provided to the buyer 120 through the system 100 and a 360-degree virtual reality or VR. Besides, the system server provides an interface for putting bicycles up for auction to buyers when selling them.

As illustrated in FIG. 2, the system 100 in accordance with one example embodiment of the present invention consists of an information collecting part 210, a bicycle verifying part 230, a pricing part 240, a bicycle selling part 250, and trade-in database 260.

The information collecting part 210 is composed of an information entering module 212 and an information storing module 214. The information entering module 212 collects the member information entered by the seller 110 and the buyer 120 through membership subscription by the medium of a webpage, a website, or a mobile site configured to get a variety of services in relation to trading in used bicycles. It collects even the bicycle information entered by the seller 110 who intends to sell the bicycle. The member information is personal information including a name, age, gender, an address, contact number, an email address, etc. of the seller 110 or the buyer 120. The bicycle information is related to the bicycle the seller intends to sell, including a type, time of manufacture and purchase, accident history, tune-up information, specific matters, etc. The bicycle information may include a selling price of the bicycle of the seller 110, i.e., an expected selling price. The information entering module 212 transmits the member information and the bicycle information to the information storing module 214. The information storing module 214 classifies the member information and the bicycle information transmitted from the information entering module 212 according to predetermined conditions and stores the classified information to an information database. In the information entering module 212, detailed information in relation to the bicycle, including a result verified by the bicycle verifying part 230, a reasonable asking price and a final asking price computed and determined by the pricing part 240, a bid price determined through the bicycle selling part 250, etc., is recorded and stored.

The bicycle verifying part 230 which verifies the bicycle provided by the seller 110 consists of a non-destructive testing or NDT module 232, and a module 234 for appraising bicycle performance. The bicycle verifying part 230 may verify the bicycle of the seller 110 that has been taken on consignment and kept. In addition, the bicycle verifying part 230 may also verify the bicycle at a place where the seller 110 keeps it. In other words, it may also verify the bicycle through an inspection on the spot by the appraiser 130.

The NDT module 232 verifies the bicycle through a NDT on the inside of the bicycle frame and creates a NDT referral. The appraiser 130 that is a company or a person with NDT certification may conduct NDT to increase reliance on the verification. A crack in the bicycle frame is not shown by appearance but it is an element that gives serious impacts over the determination of the performance, the price, etc. of the bicycle. In the past, buyers had no choice but to buy bicycles by trusting unilateral information provided by sellers. As the system 100 given in the present invention verifies the inside of the bicycle frame through the NDT, the used bicycle may be traded in more reliably. The module 234 for appraising bicycle performance appraises performance of the bicycle including a drive system and wheelsets except the frame and creates an opinion on appraisal of performance of the bicycle. The professional appraiser 130 allows the more reliable trade-in of the used bicycle by creating the opinion on the appraisal of performance of the bicycle.

The pricing part 240 as a part for determining the final asking price to sell the bicycle consists of a module 242 for computing a reasonable price and a module 244 for determining a final price. The module 242 for computing a reasonable price computes a reasonable asking price of the bicycle based on the result verified by the bicycle verifying part 230. The module 242 for computing the reasonable price computes the reasonable asking price thereof based on the bicycle information stored in the information storing module 214, including a type, time of manufacture and purchase, special matters, etc., and the NDT referral and the opinion on appraisal of performance of the bicycle created by the bicycle verifying part 230. The module 244 for determining the final price provides the seller 110 with the reasonable asking price computed by the module 242 for computing the reasonable price and determines the final asking price when the seller accepts it. At the time, the module 244 for determining the final price compares the reasonable asking price computed by the module 242 for computing the reasonable price with the expected selling price of the bicycle information stored in the information storing module 214 and adjusts and finally determines the final asking price through the acceptance of the seller 110.

The bicycle selling part 250 sells the bicycle to the buyer 120 based on the final asking price determined by the pricing part 240. To do this, the bicycle selling part 250 provides the buyer 120 with information selected from the bicycle information stored in the information storing module 214. The bicycle selling part 250 provides the buyer 120 with the result verified by the bicycle verifying part 230 including the NDT referral and the opinion on appraisal of performance of the bicycle. In addition, the bicycle selling part 250 has a module 252 for providing a virtual reality or VR video, which provides the buyer 120 with a 360-degree VR video of the bicycle created by the module 252 for providing the VR video. When providing the various kinds of information to the buyer 120, the bicycle selling part 250 may allow the buyer 120 to identify a condition and performance of the bicycle more clearly and buy the bicycle. The bicycle selling part 250 may provide the final asking price determined by the pricing part 240 to the buyer 120 by setting it as a starting bid price and offer to the seller 110 the highest bid placed by the buyers 120 and allow a bicycle trade-in to be achieved when the seller 110 accepts the offered price.

The trade-in database 260 makes, as database and as big data, information on bicycle trade-ins which have been achieved through the bicycle selling part 250 and it is composed of a module 262 for making trade-in information as database and a big data module 264. The module 262 for making the trade-in information as database makes the information on bicycle trade-ins which have been achieved as database. The information on the bicycle trade-ins includes the seller's member information, the buyer's member information, information on the bicycle, and the seller's expected selling price stored in the information storing module 214, the reasonable asking price computed from the module 242 for computing the reasonable price, and an actual sale price traded through the bicycle selling part 250.

Based on the information on bicycle trade-ins databased by the module 262 for making the trade-in information as database, the big data module 264 makes as big data a buying tendency of the buyer 120. At the time, it may make as big data the buying tendency of the buyer 120 by age, gender, brand, price, etc. based on the information on the trade-in of the bicycle. The buying tendency of the buyer which has been made as big data through the big data module 264 is transmitted to the module 242 for computing the reasonable price in the pricing part 240. By referring to the buying tendency of the buyer as big data through the big data module 264, the module 242 for computing the reasonable price in the pricing part 240 may compute the reasonable asking price and this may cause used bicycle trade-ins to be activated.

The information collecting part 210, the bicycle verifying part 230, the pricing part 240, the bicycle selling part 250, and the trade-in database 260 of the present invention have individual optimal algorithms fit for their roles.

As such, the system 100 in accordance with the present invention allows the more reliable used bicycle trade-in by providing the buyer 120 with information on the inside of the frame, which cannot be seen by appearance, through the NDT. Furthermore, it may allow the trade-in of the used bicycle to be more actively made by making trade-in information as database and as big data, and computing the reasonable asking price depending on the buyer's buying tendency.

FIG. 3 is a flowchart roughly representing a method for trading in a used bicycle in accordance with one example embodiment of the present invention.

The method for trading in the used bicycle in accordance with one example embodiment of the present invention is a method for intermediating between a seller and a buyer to help them trade in a used bicycle with each other, under which the bicycle provided by the seller 110 is sold to the buyer 120 after the inside of the frame of the bicycle is verified through NDT.

It is desirable that the method for trading in the used bicycle in accordance with one example embodiment of the present invention may be conducted by using the system 100 as shown in FIG. 2 but it is not limited to this. As illustrated in FIG. 3, the flowchart of the method for trading in the used bicycle in accordance with one example embodiment of the present invention is as shown below. First, the seller 110 and the buyer 120 respectively enter their member information and join to be members at S310. The member information is personal information such as a name, age, gender, an address, contact number, and an email address of the seller 110 or the buyer 120.

Next, the seller 110 enters the bicycle information at S320. The bicycle information is information regarding the bicycle the seller intends to sell, including a type, time of manufacture and purchase, accident history, tune-up information, a specific matter, etc. of the bicycle. The bicycle information may include the price of the bicycle asked for by the seller 110, i.e., the expected selling price.

After that, the bicycle corresponding to the bicycle information entered by the seller 110 is provided at S330. At the step of S330, the seller 110 provides the bicycle to verify it. The bicycle may be taken on consignment and kept and may be taken on the spot to make an appraiser 130 verify the bicycle.

Next, the bicycle provided by the seller 110 is verified at S340. At the step of S340 of verifying the bicycle, conditions and performance of a variety of types of bicycles may be verified, and particularly, the inside of bicycle frames may be verified through NDT. The performance of the bicycle including the performance of its drive system and wheelsets is appraised. The appraiser 130, as a company or a person with NDT certification that conducts the NDT, prepares a NDT referral and the even appraises the drive system and wheelset of the bicycle. This step allows more objective and more accurate information to be provided to the buyer 120 and leads used bicycle trade-ins to be made more reliably.

Based on the result of verifying the bicycle, including the NDT referral, the opinion on appraisal of performance of the bicycle, etc., at the step of S340, a reasonable asking price of the bicycle is computed by referring to the bicycle information such as a type, time of manufacture and purchase, specific matters, etc. of the bicycle at S350. The reasonable asking price may be computed through a step of S395 to be explained later by referring to a buying tendency of the buyer 120 which has been made as big data. As this allows the reasonable asking prices fit for buying tendencies of individual buyers 120 to be computed, used bicycle trade-ins may be more actively made.

The reasonable asking price computed at the step of S350 is provided to the seller 110 and the final asking price is determined through acceptance of the seller 110 at S360. At the time, after the expected selling price and the reasonable asking price, which are included in the bicycle information, are compared with each other, the final asking price is adjusted and then determined through the acceptance of the seller 110.

Next, information related to the purchase of the bicycle is provided to the buyer 120 at S370. Because the buyer 120 has less information on the used bicycle for sale than the seller 110, various types of information regarding the bicycle for sale must be provided to the buyer 120 for a more reliable used bicycle trade-in. Information regarding purchase including a type, time of manufacture and purchase, tune-up, accident history, special matters, etc., which is included in the bicycle information, may be provided to the buyer 120. Besides, the result of verifying the bicycle including the NDT referral, the opinion on appraisal of performance of the bicycle, etc. at the step of S340 may be provided to the buyer 120. Besides, a 360-degree VR video of the bicycle may be provided to the buyer 120. By providing the buyer 120 with such various types of information regarding the bicycle for sale, the buyer 120 may identify the condition, performance, etc. of the bicycle more accurately.

Based on the final asking price determined at the step of S360, the bicycle is sold to the buyer 120 at S380. The step of S380 may be conducted at auction or bidding. For example, a bid starts with a final asking price as a starting bid price, and the highest bid price offered by the buyer 120 is provided to the seller 110. When the seller 110 accepts the highest bid price, the bicycle is traded in. Under this way, the bike may be sold.

Next, the information on the bicycle trade-in which has been completed becomes database at S390. The information on the bicycle trade-in includes the seller's member information, the buyer's member information, the bicycle information, the seller's expected selling price, the reasonable asking price, and actual sale price.

Based on the information on the bicycle trade-in made as the database at the step of S390, a buying tendency of the buyer 120 becomes made as big data at S395. At the step of S395, the buying tendency of the buyer 120 by age, gender, brand, price, etc. may become big data based on the information on the bicycle trade-in. The buying tendency of the buyer as big data may be used when the reasonable asking price is computed at the step of S350 as explained above.

As such, when used bicycles are traded in through the method for trading in used bicycles in accordance with the present invention, information on the inside of the bicycle frames is provided through NDT, and therefore, the more reliable used bicycle trade-ins are possible to be made. In addition, as reasonable asking prices may be computed depending on buyers' buying tendencies based on trade-ins information that become made as database and as big data, the used bicycle trade-ins may be more actively made.

In accordance with the present invention, more reliable used bicycle trade-ins may be achieved by verifying defects including cracks that may exist in a bicycle frame through NDT on inside of a frame of the bicycle.

What is claimed is:

1. A system for intermediating a used bicycle trade-in between a seller and a buyer, comprising:
   a bicycle verifying unit to perform a non-destructive testing for verifying inside of a frame of a bicycle provided by the seller;
   a computer configured to communicate with a bicycle verifying unit, wherein the computer comprises:
   a pricing part including a module for computing an asking price of the bicycle based on a result verified by the bicycle verifying unit and a module for determining a final asking price through acceptance of the seller by providing the buyer with the asking price computed by the module for computing the price; and
   a bicycle selling part for selling the bicycle to the buyer based on the final asking price computed by the price computed by the pricing part.

2. The system of claim 1, wherein the computer is configured to communicate with the bicycle verifying unit to further appraise performance of a drive system and wheelsets of the bicycle.

3. The system of claim 2, wherein
   the bicycle selling part provides the buyer with a NDT referral and the opinion on appraisal of performance of the bicycle sent from the bicycle verifying unit for appraising the bicycle performance; and
   the bicycle selling unit further includes a module for providing a 360-degree VR video of the bicycle.

4. The system of claim 1, wherein the bicycle selling part provides the seller with the highest bid price by starting the final asking price as a starting bid price, and the bicycle trade-in is achieved when the seller accepts the offered price.

5. The system of claim 1, wherein the computer is configured to communicate with the bicycle verifying unit to verify the bicycle of the seller taken on consignment or through an actual inspection on the spot.

6. The system of claim 1, wherein the computer further comprising an information collecting part including an information entering module for receiving member information and bicycle information from the seller and member information from the buyer and an information storing module for classifying, and storing in a database, the member information and the bicycle information entered in the information entering module.

7. The system of claim 6, wherein the bicycle information includes the seller's expected selling price; and the module for determining the final price adjusts and determines the final asking price by comparing the asking price with the expected selling price.

8. The system of claim 6, wherein the computer further comprises a trade-in database including a module for making, as database, information on bicycle trade-in which has been completed through the bicycle selling part and the information on the bicycle trade-in includes the seller's member information, the buyer's member information, the bicycle information, the seller's expected selling price, and an actual sale price.

* * * * *